United States Patent Office 3,659,014
Patented Apr. 25, 1972

3,659,014
SUBSTITUTED CINNAMAMIDES IN
MYORELAXANT COMPOSITIONS
Michel Bayssat, Louis Fontaine, and Marcel Grand, Lyon, France, assignors to Lipha Lyonnaise Industrielle Pharmaceutique, Lyon, France
No Drawing. Filed Mar. 31, 1970, Ser. No. 24,359
Claims priority, application France, Apr. 2, 1969, 6910054
Int. Cl. A61k 27/00
U.S. Cl. 424—324                                 5 Claims

ABSTRACT OF THE DISCLOSURE

The present invention concerns new cinnamamides of formula:

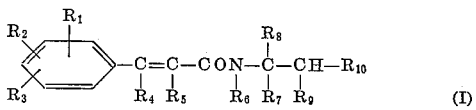

(I)

in which $R_1$ and $R_3$ are hydrogen, a lower alkyl or lower alkoxy radical; $R_2$ is hydrogen, a halogen, a lower alkyl or lower alkoxy radical; $R_4$ and $R_5$ are hydrogen or a lower alkyl radical; $R_6$ is hydrogen, a lower alkyl or lower hydroxy alkyl radical aryl radical or $$C_2H_5NH-COO-C_2H_4-$$

$R_7$ and $R_8$ are hydrogen, a lower alkyl or lower hydroxy, alkyl radical; $R_9$ is hydrogen, a lower alkyl or lower hydroxy alkyl radical; $R_{10}$=halogen, a hydroxy radical—except when $R_1$ to $R_9$=H and $R_1$, $R_2$, $R_3$=CH$_3$O, $R_4$=CH$_3$ and $R_5$ to $R_9$=H, a lower alkyl radical, a lower hydroxyalkyl radical, NH$_2$—COO, a lower alkyl radical

—NH—COO and aryl radical —NH—COO. The invention is relative to preparation processes and medicine containing as active principle a cinnamamide of Formula I, in which the radicals $R_1$ to $R_9$ have the same meanings as above and $R_{10}$=halogen, a hydroxy radical except when $R_1$, $R_2$, $R_3$=CH$_3$O, $R_4$=CH$_3$ and $R_5$ to $R_9$=H—lower hydroxy alkyl, NH$_2$COO, lower alkyl —NHCOO—aryl—NHCOO The present invention relates to substituted cinnamamides.

Certain derivatives of cinnamamides are already known. The N-(2-hydroxyethyl)-cinnamamide has in particular been prepared by O. K. Behrens et al. J. Biol Chem. 175–171–92 (1948). These authors studied this molecule solely as a biosynthesis intermediary, without investigating its pharmacological properties.

The present invention is particularly concerned, with novel substituted cinnamamides, as industrial products, and with new medicines containing substituted cinnamamides as active principles, which are outstanding as muscle relaxators, and in addition characterised by their low toxicity and their long duration of action.

The novel cinnamamides are represented by the formula

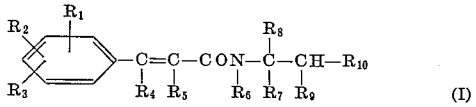

(I)

in which $R_1$ and $R_3$ are each a member of the group consisting of hydrogen, a lower alkyl and lower alkoxy radical; $R_2$ is a member of the group consisting of hydrogen, a halogen, a lower alkyl and lower alkoxy radical; $R_4$ and $R_5$ are each a member of the group consisting of hydrogen and a lower alkyl radical; $R_6$ is a member of the group consisting of hydrogen, a lower alkyl and lower hydroxyl alkyl radical, aryl radical and $C_2H_5NHCOO—CH_4$ $R_7$ and $R_8$ are each a member of the group consisting of hydrogen, a lower alkyl radical or lower hydroxyalkyl radical $R_9$ is a member of the group consisting of hydrogen, a lower alkyl and lower hydroxyalkyl radical; $R_{10}$ is a member of the group consisting of a halogen, a hydroxy radical—except when $R_1$, $R_2$, $R_3$, $R_4$, $R_5$, $R_6$, $R_7$, $R_8$ and $R_9$ are hydrogen—and when $R_1$, $R_2$, and $R_3$ are a methoxy radical, $R_4$ the methyl radical and $R_5$ to $R_9$ are hydrogen—a lower hydroxy alkyl radical, NH$_2$COO, lower alkyl NHCOO and aryl NHCOO.

The compounds of the invention, in the formulae of which $R_{10}$ is a member of the group consisting of the hydroxy, lower alkyl and lower hydroxy alkyl radical, are obtained by condensation of a reactive derivative of a cinnamic acid capable of providing the group represented by Formula II, in which (II)

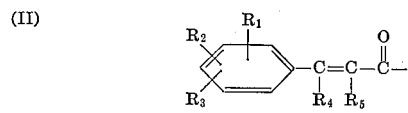

$R_1$, $R_2$, $R_3$, $R_4$ and $R_5$ have the same meanings as previously, with a hydroxy alkylamine of formula

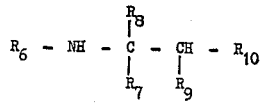

in which $R_6$, $R_7$, $R_8$ and $R_9$ have the same meanings as previously and $R_{10}$ is a member of the group consisting of hydroxy radical and lower hydroxy alkyl radical.

The reactive derivative of the cinnamic acid is preferably an acid chloride, the acid anhydride or an ester.

The transformation of the cinnamic acids capable of permitting the introduction of the group of Formula II can be effected by means of various reactants. To this end, it is possible to use phosphorous trichloride, phosphorus tribromide, phosphorus pentachloride, phosphorus pentabromide, phosphorus oxychloride, sulphuryl chloride or thionyl chloride. However, it is preferred to use thionyl chloride for the preparation of the corresponding intermediate acid chlorides.

The reaction can take place at temperatures which are within the range from about 20° C. to about 100° C. in the absence of a solvent or in a solvent which does not enter into reaction under the conditions being used. These solvents can, for example, be chloroform, methylene chloride, ether, carbon tetrachloride, benzene and analogous solvents.

The acid halide which is obtained is then treated with the appropriate hydroxy alkylamine. This reaction can be effected at temperatures which are in the range from about 5° C. to about 50° C. As the reaction can be exothermic, it is preferred to effect this in a solvent which does not enter into reaction under the conditions being used. The solvents which can be employed are, for example, chloroform, dioxane, tetrahydrofuran and analogous solvents. It is possible to use an acid acceptor, such as sodium hydroxide, sodium carbonate, potassium carbonate, sodium bicarbonate, potassium bicarbonate, pyridine, triethylamine and dimethylaniline. In certain cases, the hydroxyalkylamine can act as its own acid acceptor, by using an excess which is at least twofold of this latter.

The transformation of the cinnamic acids into corresponding acid anhydrides can easily be effected by the interaction of a cinnamic acid with its corresponding acid halide. The resulting acid anhydride is then treated with an appropriate hydroxy alkylamine, thereby obtaining the desired amide.

The alkyl esters of cinnamic acids can easily be prepared by standard esterification processes. The amidation of intermediate esters can be effected by treatment with an appropriate hydroxy alkylamine under conditions which are well-known in the art.

The transformation of the alcohols according to Formula I into corresponding halides is easily effected by means of different reactants, by reaction of the alcohol in question with a halogenated reactant. Thionyl chloride is the preferred reactant of the invention. The reaction can be effected at temperatures which are in the range from about 10° C. to about 50° C. in a solvent which does not enter into reaction under the conditions being used. Benzene is the preferred solvent of the invention. It is also possible to use an acid acceptor, such as pyridine.

The transformation of the alcohols according to Formula I into carbamates is effected by means of an acylation agent of appropriate carbamic acid type. The expression "acyl agent of carbamic acid type," as it is used here, designates one or more compounds capable of transforming a —$CH_2OH$ group into a group represented by the Formula IV

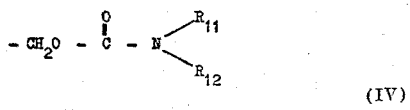

(IV)

in which $R_{11}$ and $R_{12}$ are each a hydrogen atom or an alkyl or aryl radical, in one or more reaction steps. The processes for transforming hydroxyl groups into carbamate groups are well-known in practice and it is possible to employ any process of this type which gives the desired carbamates of the invention.

A very convenient method of preparation consists in causing the alcohol of general Formula I ($R_{10}$=OH or a hydroxy alkyl radical) to react with an agent of general formula:

(V)

in which R is a halogen atom, an alkoxy radical or an aryloxy radical, and X is a halogen atom, and in causing the intermediary thus formed to react with ammonia or with an amine of general formula:

in which $R_{11}$ and $R_{12}$ have the same meanings as in the Formula IV.

Phosgene is preferably used in the first step and ammonia in the second step. The ammonia can be present, for example, in the form of ammonium hydroxide. The resulting carbamate can be obtained by conventional processes, such as extraction, concentration and crystallisation.

As a modification, the alcohol of general Formula I ($R_{10}$=OH or a hydroxy alkyl radical) can be caused to react with an appropriate alkyl or aryl isocyanate.

Furthermore, the use of isocyanate gives carbamates in which $R_{11}$ is a hydrogen atom and $R_{12}$ is an alkyl or aryl radical.

According to one of the objects of the invention, the new medicine described contains, as active principle, a hydroxy alkyl cinnamamide, represented by the Formula I, in which:

$R_1$ and $R_3$ are each a member of the group consisting of hydrogen, a lower alkyl and lower alkoxy radical,
$R_2$ is a member of the group consisting of hydrogen, a halogen, a lower alkyl and lower alkoxy radical;
$R_4$ and $R_5$ are each a member of the group consisting of hydrogen and a lower alkyl radical;
$R_6$ is a member of the group consisting of hydrogen, a lower alkyl radical, lower hydroxy alkyl radical, aryl radical and $C_2H_5NH$—COO—$C_2H_4$;

$R_7$ and $R_8$ are each a member of the group consisting of hydrogen, a lower alkyl and lower hydroxy alkyl radical;
$R_9$ is a member of the group consisting of hydrogen, a lower alkyl and lower hydroxy alkyl radical;
$R_{10}$ is a member of the group consisting of halogen, a hydroxy radical—except when $R_1$, $R_2$, $R_3$, are a methoxy radical, $R_4$ is the methyl radical and $R_5$ to $R_9$ are hydrogen—lower hydroxy alkyl, $NH_2COO$, $C_2H_5$—NH—COO, $C_6H_5$—NH—COO The therapeutic compositions containing, as active principle, a hydroxy alkyl cinnamamide as above are effective as myorelaxants at doses which are between 10 and 1000 mg. per unit dose, it being possible to regulate the posology to obtain the best possible therapeutic response.

Examples of preparations of compounds according to the present invention are given below, as well as pharmacological and clinical tests and examples of pharmaceutical formulations, which illustrate the invention in a non-limiting manner.

EXAMPLE 1

N-(2-hydroxyethyl)cinnamamide,
$C_{11}H_{13}NO_2$    M=191.22

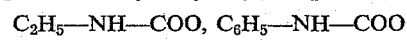

A solution of 968.4 g. (5.8 moles) of cinnamoyl chloride in 1000 ml. of dioxane is added dropwise to a solution of 835.2 g. (11.6 moles+20%) of ethanolamine in 800 ml. of dioxane. The temperature is kept in the region of 20° C. On completing the addition, stirring takes place for one hour at normal temperature, the solution then being poured into iced water+hydrochloric acid, whereafter the formed precipitate is suction-filtered, washed with water containing bicarbonate and then again with water. The product obtained after extraction with chloroform from the mother liquors is added to that obtained after drying.

The yield is of the order of 85 to 95% of a product which crystallises in ethyl acetate or acetone, in the form of beautiful white crystals. M.P.=100.5–102.5° C.

*Gravimetric analysis.*—Calculated (percent): C, 69.09; H, 6.85; N, 7.33. Found (percent): C, 69.33; H, 6.70; N, 7.53.

| Infra-red spectrum (KBr): | Cm.$^{-1}$ |
|---|---|
| $\mu$OH—NH | 3.300 |
| $\mu$CO | 1.600 |
| $\delta$CH of CH=CH trans | 975 |
| 5 adjacent H's on the phenyl | 715–770 |

EXAMPLE 2

N-(2-chlorethyl) cinnamamide $C_{11}H_{12}ClNO$    M=209.68

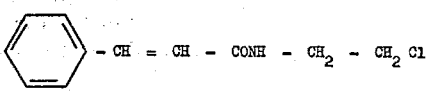

7.2 g. (0.6 mole/10) of thionyl chloride are added dropwise, at a temperature below or equal to 45° C., to a solution of 11.4 g. (0.6 mole/10) of N-(2-hydroxyethyl)-cinnamamide and 4.8 g. (0.6 mole/10) of pyridine, in 40 ml. of benzene distilled over sodium. Boiling is maintained for 4 hours. The solution is taken up in water, extracted with benzene, dried over sodium sulphate and the solvent is driven off. The yield is of the order of 74% of product, which crystallises in a mixture (1:0.5) of hexane and dichlorethane in the form of beige-coloured flakes. M.P.=103–104.5° C. (capillary tube).

*Gravimetric analysis.*—Calculated (percent): C, 62.99; H, 5.77; N, 6.68; Cl, 16.91. Found (percent): C, 63.05; H, 5.79; N 6.53; Cl, 16.97.

Infra-red spectrum (KBr): Cm.$^{-1}$
μNH ---- 3.260
μCO ---- 1.660
δCH of CH=CH trans ---- 970
5 adjacent H's on the phenyl ---- 735–770

EXAMPLE 3

N-(2-hydroxyethyl)-para-chloro cinnamamide $C_{11}H_{12}ClNO_2$     M=225.68

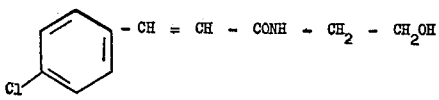

Using the working conditions of Example 1 and starting with 8 g. (0.4 mole/10) of para-chloro cinnamic acid chloride a product is obtained which crystallises in the form of white needles in ethyl acetate and melts at 137–138.5° C. in a capillary tube.

Gravimetric analysis.—Calculated (percent): C, 58.53; H, 5.36; N, 6.21; Cl, 15.71. Found (percent): C, 58.72; H, 5.29; N, 6.06; Cl, 15.62.

Infra-red spectrum (KBr): Cm.$^{-1}$
μOH—NH ---- 3.300
μCO ---- 1.660
δCH of CH=CH trans ---- 975
2 adjacent H's on the phenyl ---- 820

EXAMPLE 4

N-(2-chlorethyl)-para-chloro cinnamamide $C_{11}H_{11}Cl_2NO$     M=244.12

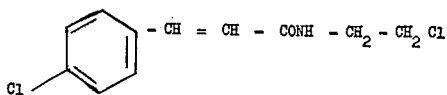

Using the conditions of Example 2 and starting with 13 g. (0.575 mole/10) of N-(2-hydroxyethyl)-para-chloro cinnamamide, a product is obtained which crystallises in the form of yellow needles in dichlorethane and melts at 144–146° C. in a capillary tube.

Gravimetric analysis.—Calculated (percent): C, 54.11; H, 4.54; N, 5.74; Cl, 29.05. Found (percent): C, 54.15; H, 4.69; N, 5.80; Cl, 28.93.

Infra-red spectrum (KBr): Cm.$^{-1}$
μNH ---- 3.280
μCO ---- 1.660
δCH of CH=CH trans ---- 970
2 adjacent H's on the phenyl ---- 820

EXAMPLE 5

N-(2-hydroxyethyl)-para-methoxy cinnamamide $C_{12}H_{15}NO_3$     M=221.25

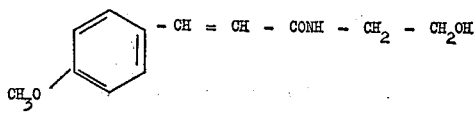

Using the conditions of Example 1 and starting with 16.3 g. (mole/12) of para-methoxy cinnamic acid chloride, a product is obtained which crystallises in ethyl acetate in the form of fine white flakes and melts at 122–124° C. in a capillary tube.

Gravimetric analysis.—Calculated (percent): C, 65.14; H, 6.84; N, 6.33. Found (percent): C, 65.21; H, 6.65; N, 6.22.

Infra-red spectrum (KBr): Cm.$^{-1}$
μOH—NH ---- 3.420–3.300
μCO ---- 1.650
δCH of CH=trans ---- 975
2 adjacent H's on the phenyl ---- 820

EXAMPLE 6

N-(2-chloro)-para-methoxy cinnamamide $C_{12}H_{14}ClNO_2$     M=239.70

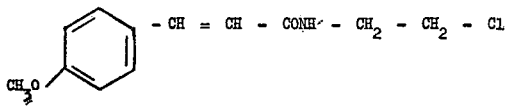

Using the working conditions of Example 2 and starting with 11.1 g. (0.5 mole/10) of N-(2-hydroxyethyl)-(para-methoxy cinnamamide), a product is obtained which crystallises in dichlorethane in the form of very small beige-coloured flakes and melts at 127–128.5° C. in a capillary tube.

Gravimetric analysis.—Calculated (percent): C, 60.12; H, 5.89; N, 5.84; Cl, 14.79. Found (percent): C, 60.30; H, 5.71; N, 5.76; Cl, 14.61.

Infra-red spectrum (KBr): Cm.$^{-1}$
μNH ---- 3.240
μCO ---- 1.655
δCH of CH=CH trans ---- 980
2 adjacent H's on the phenyl ---- 822

EXAMPLE 7

N-[(2-hydroxy-1,1-dimethyl)-ethyl]-cinnamamide $C_{13}H_{17}NO_2$     M=219.28

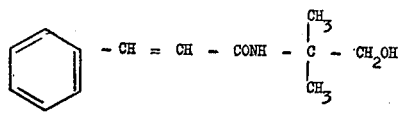

Following the conditions of Example 1 and starting with 25.2 g. (0.15 mole) of cinnamoyl chloride, 13.5 g. (0.15 mole) of 2-methyl-2-amino-1-propanol and 12.6 g. (0.15 mole) of sodium bicarbonate, a product is obtained which crystallises in ethyl acetate in the form of fine white needles and melts at 132–134° C. in a capillary tube.

Gravimetric analysis.—Calculated (percent): C, 71.20; H, 7.82; N, 6.39. Found (percent): C, 71.35; H, 8.00; N, 6.53.

Infra-red spectrum (KBr): Cm.$^{-1}$
μOH—NH ---- 3.290
μCO ---- 1.660
δCH of CH=CH trans ---- 980
5 adjacent H's on the phenyl ---- 770–715

EXAMPLE 8

N-(N-ethylethoxycarbamyl)-cinnamamide $C_{14}H_{18}N_2O_3$     M=262.30

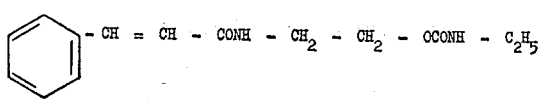

20 g. of ethylisocyanate are added to 3.8 g. (mole/50) of N-(2-hydroxyethyl)-cinnamamide. Heating takes place and, at boiling point, the alcohol enters into solution and a white precipitate appears after refluxing for about 10 minutes. The ethyl acetate in excess is distilled. A product is obtained which crystallises as a white powder in dichlorethane. Yield of the order of 90%. M.P.=148.5°–150.5° C. (capillary tube).

Gravimetric analysis.—Calculated (percent): C, 64.10; H, 6.92; N, 10.68. Found (percent): C, 63.93; H, 7.02; N, 10.80.

Infra-red spectrum (KBr): Cm.$^{-1}$
μNH ---- 3.320–3.240
μCO ---- 1.695–1.660
δCH of CH=trans ---- 965
5 adjacent H's on the phenyl ---- 780–740

EXAMPLE 9

N-(N-phenylethoxycarbamyl)cinnamamide $C_{18}H_{18}N_2O_3$      M=310.34

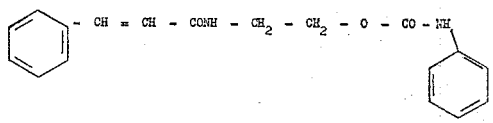

Following the operating conditions of Example 8, there are treated 1.9 g. (mole/100) of N-(2-hydroxyethyl)-cinnamamide and 1.4 g. (mole/100) of phenyl isocyanate, to which 15 ml. of carbon tetrachloride are added for homogenisation purposes, while being made tepid with agitation, and after standing, the precipitate is suction-filtered. A product is obtained which crystallises in the form of white flakes in dichlorethane. Melting point= 152–154° C. (capillary tube).

*Gravimetric analysis.*—Calculated (percent): C, 69.66; H, 5.85; N, 9.03. Found (percent): C, 69.63; H, 5.86; N, 9.16.

Infra-red spectrum (KBr):                               Cm.$^{-1}$
   $\mu$NH _____ 3.300
   $\mu$CO _____ 1.725–1.660
   $\delta$CH of CH=CH trans _____ 975
   5 adjacent H's on the phenyl _____ 770–725

EXAMPLE 10

N-(2-hydroxyethyl)-3,4,5-trimethoxy cinnamamide $C_{14}H_{19}NO_5$      M=281.30

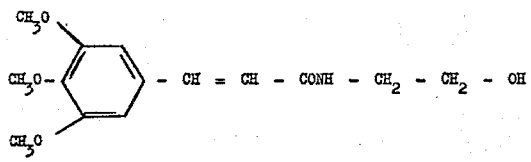

Following the conditions of Example 1 and starting with 4.8 g. (mole/50) of 3,4,5-trimethoxy cinnamic acid tarnsformed into acid chloride, used in crude form, a product is obtained which crystallises in the form of fine white needles in dichlorethane and melts at 133–134° C. in a capillary tube.

*Gravimetric analysis.*—Calculated (percent): C, 59.77; H, 6.80; N, 4.98. Found (percent): C, 59.82; H, 6.64; N, 5.08.

Infra-red spectrum (KBr):                               Cm.$^{-1}$
   $\mu$OH—NH _____ 3.430–3.320
   $\mu$CO _____ 1.650
   $\delta$CH of CH=CH trans _____ 965
   1 adjacent H on the phenyl _____ 865

EXAMPLE 11

N-(N-ethoxycarbamyl)-cinnamamide $C_{12}H_{14}N_2O_3$      M=234.25

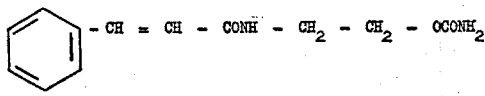

To 90 ml. (1.8 mole/10) of a solution of phosgene in toluene are added 19.1 g. (mole/10) of N-(2-hydroxyethyl)-cinnamamide in solution in 200 ml. of tetrahydrofuran and, at a temperature lower than or equal to 7° C., 23.4 g. (1.8 mole/10) of quinoline are added. A white precipitate appears. Ambient temperature is allowed to be reached, the quinoline hydrochloride in suction-filtered and dry ammonia gas is caused to bubble into the filtrate for 2 hours. The formed precipitate is suction-filtered, washed with water and added to the organic filtrate which has been concentrated.

The yield is of the order of 60 to 70% of product, which crystallises in methanol in the form of colourless flakes. M.P.=170–172° C. (capillary tube).

*Gravimetric analysis.*—Calculated (percent): C, 61.52; H, 6.02; N, 11.96. Found (percent): C, 61.63; H, 6.15; N, 12.10.

Infra-red spectrum (KBr):                               Cm.$^{-1}$
   $\mu$NH _____ 3.410–3.315–3.285–3.210
   $\mu$CO _____ 1.700–1.680
   $\delta$CH of CH=CH trans _____ 970
   5 adjacent H's on the phenyl _____ 725–765

EXAMPLE 12

N-(3-hydroxypropyl)-cinnamamide $C_{12}H_{15}NO_2$      M=205.25

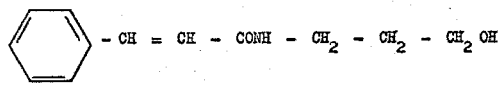

Using the working conditions of Example 1 and starting with 16.7 g. (mole/10) of cinnamoyl chloride and 30 g. (4 moles/10) of 3-amino-1-propanol, a product is obtained which crystallises in the form of white scales in dichlorethane. M.P.=82–84° C. (capillary tube).

*Gravimetric analysis.*—Calculated (percent): C, 70.21; H, 7.37; N, 6.83. Found (percent): C, 70.36; H, 7.48; N, 6.96.

Infra-red spectrum (KBr):                               Cm.$^{-1}$
   $\mu$OH—NH _____ 3.400–3.290
   $\mu$CO _____ 1.650
   $\delta$CH of CH=CH trans _____ 970
   5 adjacent H's on the phenyl _____ 765–725

EXAMPLE 13

N-(2-hydroxy-1-propyl)-cinnamide $C_{12}H_{15}NO_2$      M=205.25

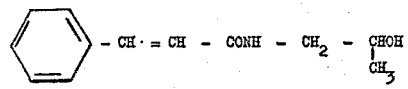

Using the working conditions of Example 1 and starting with 13.4 g. (mole/12.5) of cinnamoyl chloride and 24 g. (4 moles/12.5) of 1-amino-2-propanol, a product is obtained which crystallises in the form of a white powder in dichlorethane. M.P.=133–135° C. (capillary tube).

*Gravimetric analysis.*—Calculated (percent): C, 70.21; H, 7.37; N, 6.83. Found (percent): C, 70.40; H, 7.32; N, 6.87.

Infra-red spectrum (KBr):                               Cm.$^{-1}$
   $\mu$OH—NH _____ 3.370–3.300
   $\mu$CO _____ 1.660
   $\delta$CH of CH=CH trans _____ 980
   5 adjacent H's on the phenyl _____ 765–715

EXAMPLE 14

N-(1,3-dihydroxy-2-methyl-2-propyl)-cinnamamide $C_{13}H_{17}NO_3$      M=235.28

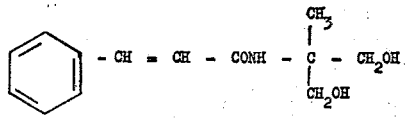

Following the working conditions of Example 1 and starting with 16.7 g. (mole/10) of cinnamoyl chloride and 23 g.

$$\left(\frac{2 \text{ moles}}{10} + 10\%\right)$$

of 2-amino-2-methyl-propane-1,3-diol, a product is obtained which crystallises in the form of white powder in dichlorethane. M.P.=105–107° C. (capillary tube).

*Gravimetric analysis.*—Calculated (percent): C, 66.36; H, 7.28; N, 5.96. Found (percent): C, 66.46; H, 7.44; N, 5.97.

Infra-red spectrum (KBr):  Cm.$^{-1}$
    $\mu$OH—NH _____ 3.420–3.310
    $\mu$CO _____ 1.660
    $\delta$CH of CH=CH trans _____ 975
    5 adjacent H's on the phenyl _____ 772–710

EXAMPLE 15

N-methyl-N-2-hydroxyethyl cinnamamide $C_{12}H_{15}NO_2$       M=205.25

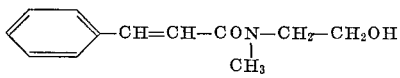

Following the conditions of Example 1 and starting with 16.7 g. (mole/10) of cinnamic acid chloride and 16.5 g.

$$\left(\frac{2 \text{ moles}}{10}+10\%\right)$$

of N-methyl-N-hydroxyethylamine, a product is obtained which crystallises in the form of a white powder in dichloroethane. M.P.=79–81° C. (capillary tube).

Gravimetric analysis.—Calculated (percent): C, 70.21; H, 7.37; N, 6.83. Found (percent): C, 70.38; H, 7.58; N, 7.00.

Infra-red spectrum (KBr):  Cm.$^{-1}$
    $\mu$OH _____ 3.350
    $\mu$CO _____ 1.650
    $\delta$CH of CH=CH trans _____ 980
    5 adjacent H's on the phenyl _____ 765–705

EXAMPLE 16

N,N-bis(2-hydroxyethyl)cinnamamide $C_{13}H_{17}NO_3$       M=235.28

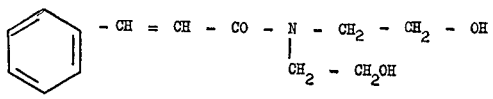

Following the conditions of Example 1 and starting with 8.4 g. (mole/20) of cinnamoyl chloride and 23 g.

$$\left(\frac{\text{mole}}{10}+10\%\right)$$

of diethanolamine, a product is obtained which crystallises in dichlorethane as a white powder. M.P.=80–82° C. (capillary tube).

Gravimetric analysis.—Calculated (percent): C, 66.36; H, 7.28; N, 5.96. Found (percent): C, 66.56; H, 7.45; N, 6.08.

Infra-red spectrum (KBr):  Cm.$^{-1}$
    $\mu$OH _____ 3.300
    $\mu$CO _____ 1.650
    $\delta$CH of CH=CH trans _____ 972
    5 adjacent H's on the phenyl _____ 770–710

EXAMPLE 17

N-(1-hydroxy-2-propyl)-cinnamamide $C_{12}H_{15}NO$       M=205.25

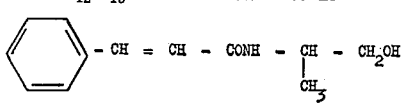

Following the conditions of Example 1 and starting with 8.4 g. (mole/20) of cinnamoyl chloride, 3.8 g. (mole/20) of alaninol and 4.2 g. (mole/20) of sodium bicarbonate, a product is obtained which crystallises as small white flakes in dichlorethane. M.P.=144–146° C. (capillary tube).

Gravimetric analysis.—Calculated (percent): C, 70.21; H, 7.37; N, 6.83. Found (percent): C, 70.29; H, 7.37; N, 6.92.

Infra-red spectrum (KBr):  Cm.$^{-1}$
    $\mu$OH—NH _____ 3.300
    $\mu$CO _____ 1.660
    $\delta$CH of CH=CH trans _____ 985
    5 adjacent H's on the phenyl _____ 775–735

EXAMPLE 18

N-(1.3-dihydroxy-2-propyl)-cinnamamide $C_{12}H_{15}NO_3$       M=221.25

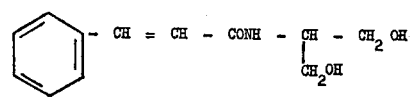

Following the conditions of Example 1 and starting with 6.5 g.

$$\left(\frac{0.3 \text{ mole}}{10}+30\%\right)$$

of cinnamoyl chloride, 2.7 g. (0.3 mole/10) of serinol and 3.8 g.

$$\left(\frac{0.3 \text{ mole}}{10}+50\%\right)$$

of sodium bicarbonate, a product is obtained which crystallises in the form of small white needles in dichlorethane. M.P.=125–126° C. (capillary tube).

Gravimetric analysis.—Calculated (percent): C, 65.13; H, 6.83; N, 6.33. Found (percent): C, 64.95; H, 6.66; N, 6.37.

EXAMPLE 19

N,N-bis-(2-hydroxyethyl)-para-methoxy cinnamamide $C_{14}H_{19}NO_4$       M=265.30

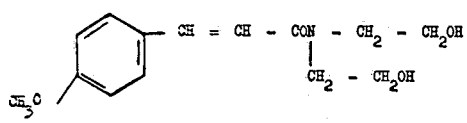

Following the conditions of Example 1 and starting with 13.5 g. (0.75 mole/10) of para-methoxy cinnamic acid chloride and 17.3 g.

$$\left(0.75\frac{\text{mole}}{10}+10\%\right)$$

of diethanolamine, a product is obtained which crystallises as white needles in dichloroethane. M.P.=95–96° C. (capillary tube).

Gravimetric analysis.—Calculated (percent): C, 63.39; H, 7.22; N, 5.28. Found (percent): C, 63.19; H, 7.37; N, 5.15.

Infra-red spectrum (KBr):  Cm.$^{-1}$
    $\mu$OH _____ 3.320
    $\mu$CO _____ 1.650
    $\delta$CH of CH=CH trans _____ 975
    2 adjacent H's on the phenyl _____ 820

EXAMPLE 20

N,N-bis(2-hydroxyethyl)para-chlorocinnamamide $C_{13}H_{16}ClNO_3$       M=269.73

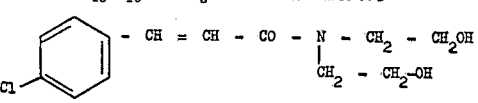

Following the conditions of Example 1 and starting with 14.6 g. (0.72 mole/10) of para-chloro cinnamic acid chloride and 33 g.

$$\left(0.72\frac{\text{mole}}{5}+10\%\right)$$

of diethanolamine, a product is obtained which crystallises as fine white needles in dichlorethane. M.P.=129–131° C. (capillary tube).

*Gravimetric analysis.*—Calculated (percent): C, 57.89; H, 5.98; N, 5.19; Cl, 13.15. Found (percent): C, 58.04; H, 5.91; N, 5.11; Cl, 12.97.

Infra-red spectrum (KBr): Cm.$^{-1}$
- $\mu$OH ---- 3.320
- $\mu$CO ---- 1.650
- $\delta$CH of CH=CH trans ---- 975
- 2 adjacent H's on the phenyl ---- 820

EXAMPLE 21

N-(2-hydroxyethyl)-3,4-dimethoxy cinnamamide $C_{13}H_{17}NO_4$    M=251.28

CH$_3$O—C$_6$H$_3$(OCH$_3$)—CH=CH—CONH—CH$_2$—CH$_2$OH

Following the conditions of Example 1 and starting with 22.6 g. (mole/10) of unpurified 3,4-dimethoxy cinnamic acid chloride, a product is obtained which crystallises in the form of small white flakes in ethyl acetate. M.P.=122–123° C. (capillary tube).

*Gravimetric analysis.*—Calculated (percent): C, 62.13; H, 6.82; N, 5.57. Found (percent): C, 61.87; H, 7.05; N, 5.51.

Infra-red spectrum (KBr): Cm.$^{-1}$
- $\mu$OH—NH ---- 3.300
- $\mu$CO ---- 1.650
- $\delta$CH of CH=CH trans ---- 970
- 2 adjacent H's on the phenyl ---- 815
- 1 H on the phenyl ---- 865

EXAMPLE 22

N-bis-[N-ethylethoxycarbamyl]-cinnamamide $C_{19}H_{27}N_3O_5$    M=377.43

C$_6$H$_5$—CH=CH—CON(CH$_2$—CH$_2$—OCONH—C$_2$H$_5$)$_2$

Following the conditions of Example 8 and starting with 12 g. (mole/20) of N,N-bis-(2-hydroxyethyl)-cinnamamide and 20 g. of ethyl isocyanate, a product is obtained which crystallises in dichlorethane as a cottony white product. M.P.=100–101° C. (capillary tube).

*Gravimetric analysis.*—Calculated (percent): C, 60.47; H, 7.21; N, 11.14. Found (percent): C, 60.64; H, 7.43; N, 11.61.

Infra-red spectrum (KBr): Cm.$^{-1}$
- $\mu$NH ---- 3.320
- $\mu$CO ---- 1.720–1.690–1.650
- $\delta$CH of CH=CH trans ---- 975
- 5 adjacent H's on the phenyl ---- 767–710

EXAMPLE 23

N-[N-ethoxycarbamyl]-para-chloro-cinnamamide $C_{12}H_{13}ClN_2O_3$    M=268.70

Cl—C$_6$H$_4$—CH=CH—CONH—CH$_2$—CH$_2$—OCONH$_2$

Following the conditions of Example 11 and starting with 8 g. (0.35 mole/10) of N-(2-hydroxyethyl) para-chloro cinnamamide, 200 ml. of tetrahydrofuran, 35 ml. (0.7 mole/10) of a solution of phosgene in toluene and 11.5 g. (0.35 mole/4) of quinoline, a product is obtained which crystallises as small needles having a cottony appearance in methanol. M.P.=195–196° C.

*Gravimetric analysis.*—Calculated (percent): C, 53.63; H, 4.88; N, 10.43; Cl, 13.19. Found (percent): C, 53.77; H, 4.85; N, 10.31; Cl, 13.04.

Infra-red spectrum (KBr): Cm.$^{-1}$
- $\mu$NH ---- 3.430–3.320–3.210
- $\mu$CO ---- 1.700–1.680
- $\delta$CH of CH=CH trans ---- 970
- 2 adjacent H's on the phenyl ---- 822

EXAMPLE 24

N-(2-hydroxy-1-propyl)para-chloro-cinnamamide $C_{12}H_{14}ClNO_2$    M=239.70

Cl—C$_6$H$_4$—CH=CH—CONH—CH$_2$—CHOH—CH$_3$

Following the working conditions of Example 1 and starting with 10.1 g. (mole/20) of para-chloro-cinnamic acid chloride and 18.7 g. (mole/4) of 1-amino-2-propanol, a product is obtained which crystallises as small white needles in ethyl acetate and melts at 150–152° C. in a capillary tube.

*Gravimetric analysis.*—Calculated (percent): C, 60.12; H, 5.89; N, 5.84; Cl, 14.79. Found (percent): C, 60.30; H, 5.98; N, 5.67; Cl, 14.76.

Infra-red spectrum (KBr): Cm.$^{-1}$
- $\mu$OH—NH ---- 3.300
- $\mu$CO ---- 1.660
- $\delta$CH of CH=CH trans ---- 990
- 2 adjacent H's on the phenyl ---- 825

EXAMPLE 25

N-[(1-bis-hydroxymethyl-2-hydroxy) ethyl]cinnamamide $C_{13}H_{17}NO_4$    M=251.28

C$_6$H$_5$—CH=CH—CONH—C(CH$_2$OH)$_2$—CH$_2$OH

Following the conditions of Example 1 and starting with 16.7 g. (mole/10) of cinnamoyl chloride, 30 ml. of dioxane, 26.6 g.

$$\left(\frac{\text{mole}}{5}+10\%\right)$$

of 2-amino-2-hydroxymethyl-propane-1,3-diol and 25 ml. of water, a product is obtained which crystallises as white needles of cottony appearance in ethyl acetate and melts at 152–154° C. in a capillary tube.

*Gravimetric analysis.*—Calculated (percent): C, 62.13; H, 6.82; N, 5.58. Found (percent): C, 62.25; H, 6.96; N, 5.55.

Infra-red spectrum (KBr): Cm.$^{-1}$
- $\mu$OH—NH ---- 3.300
- $\mu$CO ---- 1.660
- $\delta$CH of CH=CH trans ---- 975
- 5 adjacent H's on the phenyl ---- 770–715

EXAMPLE 26

N-methyl-N-(2-hydroxyethyl)-para-chloro-cinnamamide $C_{12}H_{14}ClNO_2$    M=239.70

Cl—C$_6$H$_4$—CH=CH—CO—N(CH$_3$)—CH$_2$—CH$_2$OH

Following the conditions of Example 1 and starting with 10.1 g. (mole/20) of para-chloro-cinnamic acid chloride and 15 g. (mole/5) of N-2-methylamino ethanol, a product is obtained which crystallises as white crystals in ethyl acetate. M.P.=113–115° C. in a capillary tube.

*Gravimetric analysis.*—Calculated (percent): C, 60.12 H, 5.89; N, 5.84; Cl, 14.79. Found (percent): C, 60.28; H, 6.00; N, 5.65; Cl, 14.77.

Infra-red spectrum (KBr): Cm.$^{-1}$
- μOH _____ 3.350
- μCO _____ 1.650
- δCH of CH=CH trans _____ 980
- 2 adjacent H's on the phenyl _____ 815

EXAMPLE 27

N-[(2,3-dihydroxy)-1-propyl]-cinnamamide

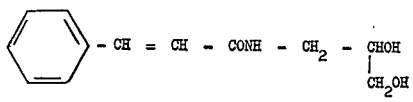

Following the conditions of Example 1 and starting with 8.4 g. (mole/20) of cinnamoyl chloride and 10 g.

$$\left(\frac{mole}{10}+10\%\right)$$

of 3-amino-propane-1,2-diol, a product is obtained which crystallises as small white grains in dichloroethane and melts at 85–87° C. in a capillary tube.

*Gravimetric analysis.*—Calculated (percent): C, 65.13; H, 6.83; N, 6.33. Found (percent): C, 65.06; H, 6.84; N, 6.24.

Infra-red spectrum (KBr): Cm.$^{-1}$
- μOH—NH _____(large)__ 3.300
- μCO _____ 1.665
- δCH of CH=CH trans _____ 970–980
- 5 adjacent H's on the phenyl _____ 755–700

EXAMPLE 28

N-phenyl-N-(2-hydroxyethyl)-cinnamamide

C$_{17}$H$_{17}$NO$_2$  M=267.32

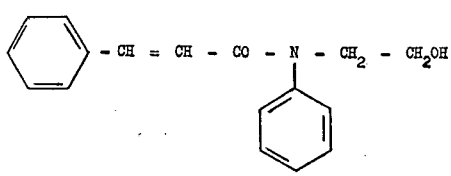

Following the conditions of Example 1 and starting with 8.4 g. (mole/20) of cinnamoyl chloride and 15 g.

$$\left(\frac{mole}{10}+10\%\right)$$

of N-(2-hydroxyethyl)-aniline, a product is obtained which crystallises in a mixture of ethyl acetate and hexane (3:1) in the form of small white flakes and which melts at 73.5° to 74.5° C. in a capillary tube.

*Gravimetric analysis.*—Calculated (percent): C, 76.38; H, 6.41; N, 5.24. Found (percent): C, 76.38; H, 6.48; N, 5.12.

Infra-red spectrum (KBr): Cm.$^{-1}$
- μOH _____ 3.440
- μCO _____ 1.650
- δCH of CH=CH trans _____ 970
- 5 adjacent H's on the phenyl _____ 765–708

EXAMPLE 29

N-(2-hydroxyethyl)-α-methyl cinnamamide

C$_{12}$H$_{15}$NO$_2$  M=205.25

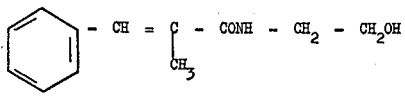

Following the conditions of Example 1 and starting with 15 g.

$$\left(\frac{mole}{10}+25\%\right)$$

of ethanolamine in 15 ml. of dioxane and 9.05 g. (mole/20) of α-methyl cinnamic acid chloride in 25 ml. of dioxane, a product is obtained which crystallises as a cottony white product in ethyl acetate and melts at 107–109° C. in a capillary tube.

*Gravimetric analysis.*—Calculated (percent): C, 70.21; H, 7.37; N, 6.83. Found (percent): C, 70.38; H, 7.44; N, 6.90.

Infra-red spectrum (KBr): Cm.$^{-1}$
- μOH—NH _____ 3.300
- μCO _____ 1.650
- 5 adjacent H's on the phenyl _____ 750–705

EXAMPLE 30

N-(2-hydroxyethyl)-β-methyl cinnamamide

C$_{12}$H$_{15}$NO$_2$  M=205.25

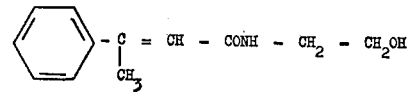

Following the conditions of Example 1 and starting with 3.6 g. (moles 2/100) of β-methyl cinnamic acid chloride (unpurified) and 10 g. of ethanolamine, a product is obtained which crystallises in dichlorethane as white crystals and melts at 75–76.5° C. in a capillary tube.

*Gravimetric analysis.*—Calculated (percent): C, 70.21; H, 7.37; N, 6.83. Found (percent): C, 70.11; H, 7.37; N, 6.93.

Infra-red spectrum (KBr): Cm.$^{-1}$
- μOH—NH _____ 3.270–3.360
- μCO _____ 1.660
- 5 adjacent H's on the phenyl _____ 770–700

EXAMPLE 31

N-(2-hydroxyethyl)-paramethyl cinnamamide

C$_{12}$H$_{15}$NO$_2$  M=205.25

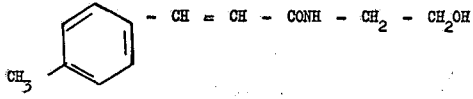

Following the conditions of Example 1 and starting with 18 g. (mole/10) of para-methyl cinnamic acid chloride and 30 g. of ethanolamine, a product is obtained which crystallises in the form of beautiful colourless needles in ethyl acetate and which melts at 107–108° C.

*Gravimetric analysis.*—Calculated (percent): C, 70.21; H, 7.37; N, 6.83. Found (percent): C, 70.33; H, 7.45; N, 6.92.

Infra-red spectrum (KBr): Cm.⁻¹
- μOH—NH _____ 3.300
- μCO _____ 1.660
- δCH of CH=CH trans _____ 980–1.000
- 2 adjacent H's on the phenyl ___ 815

EXAMPLE 32

N-(2-hydroxyethyl)-ortho-methyl cinnamamide $C_{12}H_{15}NO_2$     M=205.25

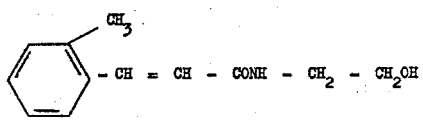

Following the conditions of Example 1 and starting with 18 g. (mole/10) of ortho-methyl cinnamic acid chloride and 30 g. of ethanolamine, a product is obtained which crystallises in ethyl acetate in the form of white crystals and melts at 120–122° C. in a capillary tube.

*Gravimetric analysis.*—Calculated (percent): C, 70.21; H, 7.37; N, 6.83. Found (percent): C, 70.06; H, 7.20; N, 6.86.

Infra-red spectrum (KBr): Cm.⁻¹
- μOH—NH _____ 3.320
- μCO _____ 1.660
- δCH of CH=CH trans _____ 980
- 4 adjacent H's on the phenyl ___ 765

EXAMPLE 33

N-(2-hydroxyethyl)-meta-methyl cinnamamide $C_{12}H_{14}NO_2$     M=205.25

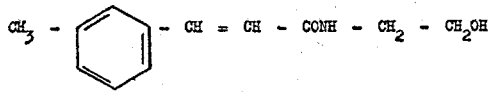

Following the conditions of Example 1 and starting with 15.3 g. (0.85 mole/10) of meta-methyl cinnamic acid chloride and 26 g. (0.425 mole/10) of ethanolamine, a product is obtained which crystallises in dichlorethane as white crystals of monohydrate. M.P.=80–82° C. in a capillary tube.

Proportion of water. Calculated, 8.07%. Found, 8.13%.

*Gravimetric analysis.*—Calculated (percent): C, 64.54; H, 7.68; N, 6.27. Found (percent): C, 64.79; H, 7.63; N, 6.37.

Infra-red spectrum (KBr): Cm.⁻¹
- μOH—NH _____ 3.450–3.260
- μCO _____ 1.660
- δCH of CH=CH trans _____ 970
- 3 adjacent H's on the phenyl ___ 780

PHARMACOLOGICAL TESTS (1) It was possible to demonstrate the pharmacological activity of this series of compounds on the muscular contractures. These compounds modify the polysynaptic reflexes, particularly at medullary level. The myorelaxation is investigated by evaluating the protective effect of the products against the mortal convulsions initiated by injecting strychnine subcutaneously into the mouse, the alkaloid modifying the chronaxis threshold of the association medullary neurons.

The products are administered by oral route, at 1/30 of the $LD_{50}$ to the mouse, 10 minutes before the strychnine treatment. The results are expressed as a percentage of protection of the animals against the mortal crises.

In the following Table I, the levels of protection observed under the conditions as described are given as a percentage value of the standard compound (mephenesin).

TABLE I

| Product | $LD_{50}$ mouse perorally in mg./kg. | Survival test after strychnine subcutaneously, treatment per os at 1/30th of $LD_{50}$ |
|---|---|---|
| Mephenesin | 1.400 | 100 |
| Cinnamamide | 1.400 | 18 |
| Example: | | |
| 1 | 3.000 | 233 |
| 2 | 3.200 | 44 |
| 3 | 1.600 | 71 |
| 4 | 3.200 | 100 |
| 5 | 3.200 | 43 |
| 7 | 3.000 | 14 |
| 8 | 1.600 | 20 |
| 9 | 3.200 | 20 |
| 10 | 2.800 | 20 |
| 11 | 3.200 | 100 |
| 12 | 3.200 | 40 |
| 13 | 2.200 | 100 |
| 14 | 900 | 60 |
| 15 | 3.000 | 100 |
| 17 | 3.200 | 120 |
| 18 | 2.400 | 43 |
| 20 | 2.100 | 28 |
| 21 | 1.500 | 28 |
| 22 | 1.500 | 14 |
| 23 | 2.400 | 28 |
| 24 | 1.000 | 56 |
| 25 | 2.400 | 25 |
| 26 | 900 | 37 |
| 29 | 1.600 | 37 |
| 30 | 3.200 | 86 |
| 31 | 3.200 | 50 |
| 32 | 3.200 | 57 |

(2) The complementary pharmacological investigation was continued in connection with the best compounds of the preceding series. The rats are decerebrated by section of the cerebral stem between the corpora quadrigemina. An electric nociceptive excitation of the plantar pulp initiates a contraction of the tibial muscle, which is recorded. The repeated excitations (every two minutes) are inhibited by administering myorelaxant substances by the digestive route (duodenal fistula). The values given in the following table represent the inhibition surface defined by the intensity of the inhibition and by the time which has elapsed between the disappearance of the response and the return of the contraction to the original amplitude. The value 100 is attributed to the surface measured by the standard (dose given: 1/30 $DL_{50}$ mouse, per orally).

TABLE II

| Products: | Test on the decerebrated mouse 50 mg./kg. L.D. |
|---|---|
| Mephenesin | 100 |
| Ex. 1 | 200 |
| Ex. 4 | <30 |
| Ex. 11 | <30 |
| Ex. 13 | 40 |
| Ex. 15 | 85 |
| Ex. 17 | 25 |

The compound of Example 1 provides a substantial gain, if account is taken of the fact that the time for return to the normal response is 1 hour for mephenesin and 3 hours for the preferred compound.

(3) Thorough investigation of the compound of Example 1, designated as "LCB 29" showed that:

(a) The duration of protection against the mortal crisis with strychnine in the mouse is decidedly better than that observed with the best known products. When giving the compounds 10 minutes, 1 hour, 2 hours, 3 hours, 4 hours and 5 hours before injecting strychnine, it is constant that the protection of 50% of the animals of a batch ($DP_{50}$: protective dose 50) is still seen, 5 hours after ingesting LCB 29, and only 2 hours after ingesting chlormezanone (the two products being given in an equitoxic dose:1/15 of the $DL_{50}$, mouse per orally).

(b) The power of action is considerable. When strychnine is perfused at constant speed into the caudal vein of the mouse in the coma vigil state, it is possible to determine the average time for the appearance of convulsive signs. After treatment with LCB 29 and chlormezanone, we obtain the following results;

TABLE III

| Product at 1/15th of the $DL_{50}$ mouse, perorally | Percentage of extension of the time for appearance of toxic signs in the treated mice, relatively to the control mice | |
|---|---|---|
| | Time for appearance of the first convulsive crisis | Opisthotonos |
| LCB 29 | 120 | 140 |
| Chlormezanone | 10 | 35 |

(c) The central action of compound LCB 29 is not very pronounced. Its analgesic activity on the mouse, using the Sigmund technique, in an equitoxic dose, is 1/5 of the $DL_{50}$ mouse per orally, which is equal to 1/3 of that of aspirin.

(d) Similarly, the transquillising activity is weak. It is measured on the mouse by the "funnel test" of Boissier, Tardy and Diverres (Med. Exp. 1960–3–81, 84). At 300 mg./kg. per orally, the preferred compound (LCB 29) only makes the test positive for 40% of the animals of the batch, whereas in an equitoxic dose 1/10 of the $DL_{50}$), chlorodiazepoxide does this in 70% of the cases.

For the compound LCB 29, in the dose of 100 mg./kg. per orally in the mouse, the analgesic and tranquillising effects fall to zero values, whereas the myorelaxant activity is already very powerful.

(3) The cortical electrical activity, measured by electrocorticography on the rabbit in the coma vigil state, is not disturbed by doses reaching 5 mg./kg. administered intravenously, whereas in the same dose, mephenesin has a sedative effect shown by the synchronisation of the cortical branches and the desynchronisation of the deep layers (Rhynencephalon-Thalamus median).

(f) The toxic effects of compound LCB 29 are limited, as is apparent from the $LD_{50}$, determined in connection with the mouse and the rat.

TABLE IV

| Species | Product | Oral route $DL_{50}$ (mg./kg.) |
|---|---|---|
| Mouse | LCB 29 | 3,000 |
| | Mephenesin | 1,400 |
| | Chlormezanone | 1,400 |
| Rat | LCB 29 | 3,000 |

(g) The chronic intoxication of the rats absorbing compound LCB 29 in the ration up to the dose of 400 mg./kg. day for several weeks does not lead to any significant effect as regards behaviour, weight, and biological, hematological or histological effects.

(h) On the autonomous nervous system, the preferred compound—on a sleeping dog and in intravenous doses reaching 30 mg./kg.—does not have any toxic effect. The arterial tension, choleresis, urinary flow, intestinal mortricity, renal vasomotricity, the central temperature, the respiratory rhythm and amplitude, the cardiac rhythm and the electrocardiogram in D2 are not significantly disturbed.

CLINICAL TESTS

Clinically, the compound LCB 29, which is (N-(2-hydroxyethyl)cinnamamide, is found to be of very great interest in rheumatology, gynaecology, in functional rehabilitation and motive re-education, either after surgical operation, or long after paralytic attacks have abated, and also in neurological contractures-developed schlerosis in discs, paraplegia. Several clinical results are given here as examples to show the interest of the compound LCB 29, considered as a medicine under such conditions. The medicine is given per orally, in tablets each titrating 200 mg. of active principle.

Observation No. 1

Mr. Maurice Le G.: 46 years old.
Bilateral coxathrosis and lumbar arthrosis, without major antecedent.
Treatment: 3 tablets per day for 15 days.

The myorelaxant effect is investigated on the lumbar para-vertebral muscles (considerable contracture to the left due to lack of equilibrium of the pelvis) and on the adductor muscles of the coxas. There is a great improvement in the left para-vertebral contracture, which is apparent towards the tenth day of treatment. Distinct improvement in the intermalleolar distance. The subjective effect is very appreciable.

Observation No. 2

Miss Jeanne G.: 34 years old.
Post-traumatic after-effects at the level of the coxa, necessitating a functional re-education.

The treatment with compound LCB 29 (3 tablets per day) makes it possible to obtain a very considerable muscular relaxation, with appreciable effect on the pains. The treatment is completed by application of a 10% ointment in the region of the coxofemoral joint. An intensive functional re-education is made possible.

Observation No. 3

Mr. Jean C.: 65 years old.
Schlerosis in discs developing for 10 years, with paralysis stage of the lower members with considerable stiffness. Numerous neurological signs, Babinsky positive.

The treatment lasts one month with 3 tablets per day.
The improvement is very considerable. The invalid, who was no longer able to ascend staircases, easily climbs several floors. He is able to walk without the aid of a stick. Then bending of the leg at the thigh has become very easy. The improvement continues.
Constantly, the treatment is very well tolerated.

FORMULATION

The medicine containing the compound LCB 29 can be supplied in several suitable medicinal forms, such as tablets, injectable ampoules, suppositories and ointments for external use.

In the forms intended for internal use, the unit dose can vary from 10 to 1,000 mg. The daily dose can vary from 500 to 1,500 mg. Different formulations are given below, as non-limiting examples.

Tablet:
 Active principle: 200 mg.
 Lactose: 50 mg.
 Royalgine: 10 mg.
 Starch: 10 mg.
 Talcum: 20 mg.
 Potato starch: 10 mg.
 Magnesium stearate: 4 mg.

Injectable ampoule:
 Active principle: 30 mg.
 95° ethanol: 5 mg.
 Distilled water: 5 ml.

In suppositories, the active doses as claimed are between 50 and 1,000 mg. As a non-limiting example:

Active principle: 100 mg.
Eutectic mixture of ester of fatty acids q.s.: 3 g.

For external use as an ointment, the active concentrations can be from 1% to 20%. As an example and always in non-limiting manner:

Active principle: 10 g.
Emulsified excipient of the oil-in-water-type, q.s.: 100 g.

What we claim is:

1. A myorelaxant composition in the form of a tablet, an injectable ampoule, a suppository and an ointment containing as its active principle a therapeutically effective amount of a cinnamamide of the formula:

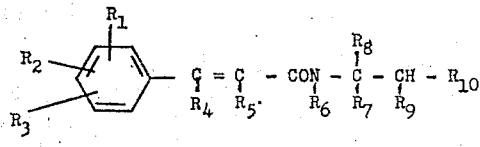

in which $R_1$ and $R_3$ are each selected from the group consisting of hydrogen, lower alkyl and lower alkoxy; $R_2$ is selected from the group consisting of hydrogen, halogen, lower alkyl and lower alkoxy; $R_4$ and $R_5$ are each selected from the group consisting of hydrogen and lower alkyl; $R_6$ is selected from the group consisting of hydrogen, lower alkyl, lower hydroxyalkyl and aryl; $R_7$ and $R_8$ are each selected from the group consisting of hydrogen, lower alkyl and lower hydroxyalkyl; $R_9$ is selected from the group consisting of hydrogen, lower alkyl, and lower hydroxyalkyl; $R_{10}$ is selected from the group consisting of halogen, hydroxyalkyl, and hydroxy except when $R_1$, $R_2$ and $R_3$ are methoxy, $R_4$ is methyl, and $R_5$ to $R_9$ are hydrogen, in dosage form in a pharmaceutically acceptable carrier.

2. Myorelaxant composition according to claim 1 wherein the daily dose of active principle is between 500 and 1500 mg.

3. Myorelaxant composition in the form of a tablet, an injectable ampoule, a suppository, and an ointment containing as its active principle a therapeutically effective amount of N-(2-hydroxyethyl)-cinnamamide, in dosage form in a pharmaceutically acceptable carrier.

4. Myorelaxant composition according to claim 3 in which the dosage form is a suppository which contains between 50 and 1,000 mg. of active principle.

5. Myorelaxant composition according to claim 3 in which the dosage form is an ointment in which the active concentration is from 1% to 20%.

References Cited

Chem. Abst., 43–2273e (2271–2274 enclosed) (1949).

STANLEY J. FRIEDMAN, Primary Examiner

UNITED STATES PATENT OFFICE
CERTIFICATE OF CORRECTION

Patent No. 3,659,014      Dated April 25, 1972

Inventor(s) Michel Bayssat et al.

It is certified that error appears in the above-identified patent and that said Letters Patent are hereby corrected as shown below:

Column 2, line 2, "$CH_4$" should read --$C_2H_4$--

Column 15, line 39, "$C_{12}H_{14}NO_2$" should read --$C_{12}H_{15}NO_2$--

Signed and sealed this 29th day of August 1972.

(SEAL)
Attest:

EDWARD M. FLETCHER, JR.
Attesting Officer

ROBERT GOTTSCHALK
Commissioner of Patents